United States Patent
Yang et al.

(10) Patent No.: US 8,880,108 B2
(45) Date of Patent: Nov. 4, 2014

(54) SHORT MESSAGE PROCESSING METHOD AND APPARATUS

(75) Inventors: Ben Bo Yang, Beijing (CN); Jia Jia Wen, Beijing (CN); Ju Wei Shi, Beijing (CN); Qi Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 13/580,208

(22) PCT Filed: Feb. 23, 2011

(86) PCT No.: PCT/EP2011/052653
§ 371 (c)(1),
(2), (4) Date: Aug. 21, 2012

(87) PCT Pub. No.: WO2011/104260
PCT Pub. Date: Sep. 1, 2011

(65) Prior Publication Data
US 2012/0315931 A1    Dec. 13, 2012

(30) Foreign Application Priority Data

Feb. 26, 2010 (CN) .......................... 2010 1 0127149

(51) Int. Cl.
*H04W 4/00* (2009.01)
*H04W 4/14* (2009.01)
*H04L 29/08* (2006.01)
*H04L 12/58* (2006.01)

(52) U.S. Cl.
CPC ............. *H04W 4/14* (2013.01); *H04L 12/5895* (2013.01); *H04L 67/146* (2013.01); *H04L 67/142* (2013.01); *H04L 67/14* (2013.01)
USPC ...................... 455/466; 455/412.1; 455/412.2

(58) Field of Classification Search
CPC ......... H04W 4/12; H04W 4/14; H04W 28/06; H04L 45/00; H04L 45/16; H04L 29/06
See application file for complete search history.

(56) References Cited

U.S. PATENT DOCUMENTS

2002/0080822 A1    6/2002   Brown et al.
2005/0286503 A1    12/2005  Oda et al.

(Continued)

FOREIGN PATENT DOCUMENTS

WO    WO 2009010958 A2    1/2009

OTHER PUBLICATIONS

International Search Report and Written Opinion, PCT/EP2011/052653, mailed Sep. 7, 2011.

(Continued)

*Primary Examiner* — Suhail Khan
(74) *Attorney, Agent, or Firm* — Scully, Scott, Murphy & Presser, P.C.; Gail H. Zarick, Esq.

(57) ABSTRACT

A short message processing method and apparatus in short message interactive communication is disclosed that allocates identification codes to each service instance and performs short message interaction with uses using numbers embedded with the identification codes. In the short message processing method and apparatus of the present invention, in response to receiving of a short message from a communication terminal, a service instance for the short message is determined based on a server-side communication number contained in the short message, and then a reply short message is sent to the communication terminal using the server-side communication number that is embedded with a service instance identification code corresponding to the determined service instance. The present invention is capable of accurately and conveniently correlating a plurality of short messages with corresponding service instances, thereby enhancing users' experience during an interactive process.

17 Claims, 6 Drawing Sheets

(56) References Cited

U.S. PATENT DOCUMENTS

2008/0009273 A1 1/2008 Jemison et al.
2008/0254815 A1 10/2008 Murphy et al.
2009/0178063 A1* 7/2009 Maffeis .................. 719/328

OTHER PUBLICATIONS

English language Abstract, CN1677963(A), dated Oct. 5, 2005.
Chinese Office Action mailed Jun. 3, 2013.

* cited by examiner

SHORT MESSAGE PROCESSING METHOD AND APPARATUS

CROSS-REFERENCE TO RELATED APPLICATIONS

The present invention relates to and claims the benefit of the filing date of commonly-owned, co-pending PCT Patent Application No. PCT/EP2011/052653, filed Feb. 23, 2011, which further claims the benefit of priority date of commonly-owned, co-pending Chinese Patent Application No. CN 201010127149.8, filed on Feb. 26, 2010 the entire contents and disclosure of which is incorporated by reference as if fully set forth herein.

TECHNICAL FIELD

The present invention relates generally to the field of short message interactive communication, and more particularly to a short message processing method and apparatus.

DESCRIPTION OF THE RELATED ART

Short Message Service (SMS) has become an important mobile communication means with its unique information arrival manner and information storage characteristic. Statistically, in 2008, short message service has occupied a share of 66.3% in value-added service market in China.

For example, the emerging Communication Enabled Business Process (CEBP) depends greatly on short message interactive technology. In CEBP mode, users can automatically interact with application servers of enterprises or other service providers through communications such as short messages. CEBP has pervaded into various aspects in all kinds of services by means of the propagation power of communications technology, such that enterprise efficiency could be significantly and conveniently improved while saving manpower cost.

With the development of short message application such as CEBP, there comes an increasingly strong demand for multi-round short message interactive service between users and application servers. For example, in the scenario as shown in FIG. 5, when a user posts a topic by means of short message interaction, he or she needs to sequentially submit "Title", "Abstract", and "Content" to an application server through three pieces of short messages. After the server has gathered the three pieces of short messages, an interface of a third-party network application server is called to publish this post. In case where multi-round interactions are required for completing one service instance, it is necessary to correlate a plurality of short messages with one another in the application server.

In order to realize such correlation, a rules-engine based approach is often adopted. In such rules-engine based approach, however, all relevant user interactive data are stored in a system memory. For short messages, a possible interactive period may be over 24 hours or even longer such that the occupied system memory always cannot be freed, thereby the uncompleted service instance data will cause a heavy burden to a system having great amounts of information. In addition, once the application server is restarted or accidentally damaged, it is impossible to resume a service instance that is being interacted.

Further, the rules-engine based approach cannot handle the scenario shown in FIG. 5. In FIG. 5, short messages from the same user arrive at the application server in an order of "Title 1", "Abstract 1", "Title 2", "Content 1", "Abstract 2" and "Content 2", that is, in the case when a service instance has not completed yet, a message of another service instance from the same user is received, the rules-engine based approach cannot perform proper correlation. As such, loss or confusion of information would occur.

In order to enable to proceed multi-round interactive services simultaneously, different service instances must be identified. For this purpose, the following three identification solutions have been proposed in the prior art. The first solution is to require the user to explicitly add sequence codes to short message text content. However, this solution requires users to remember a sequence code that is generally complicated and to add this sequence code correctly to the short message content as well. This solution is not only tedious but also prone to error, for example, the user may wrongly remember the sequence code or enter an incorrect one, which then results in poor user experience.

The second solution is to modify MsgID (short message serial number) field in short messages, wherein the MsgID field is used for uniquely identifying a piece of short message but is invisible at client side. However, the MsgID field is a field that is automatically created and added by a system according to a current short message gateway protocol (for example, SMGP) and is not allowed to be modified. Further, adopting this solution generally requires modifying a client-side protocol; otherwise it would not be supported by the client side.

The third solution is to correlate service instances by means of factors such as time, information redundancy or the like. For example, all short messages received during a predetermined time period can be considered as one service instance. Obviously, this solution has a very low accuracy.

Thus, it is desirable to provide a method and apparatus for dynamically correlating service instances in short message interactive communication in an accurate and convenient manner.

SUMMARY OF THE INVENTION

An object of one embodiment of the present invention is to accurately and conveniently correlate service instances in short message interactive communication.

The short message processing apparatus and method of the present invention can dynamically allocate a service instance identification code, embed the identification code into a server-side communication number and send short messages to a user using the server-side communication number, to enable dynamical correlation of an ongoing interactive service instance merely by the user directly replying the server-side communication number.

According to a first aspect of the present invention, provided is a short message processing method, comprising: in response to receiving of a short message from a communication terminal, determining a service instance for the short message based on a server-side communication number contained in the short message; and sending a reply short message to the communication terminal using the server-side communication number that is embedded with a service instance identification code corresponding to the determined service instance.

According to a second aspect of the present invention, provided is a short message processing apparatus, comprising: determination means for, in response to receiving of a short message from a communication terminal, determining a service instance for the short message based on a server-side communication number contained in the short message; and sending means for sending a reply short message to the communication terminal using the server-side communication number that is embedded with a service instance identification code corresponding to the determined service instance.

Compared to technical solutions in the prior art, the present invention is capable of accurately and conveniently correlating a plurality of short messages with relevant service instances independent of the arrival time of these short messages, even when multiple interactive service instances from a same user are carried out simultaneously. According to the present invention, a user can carry out interactions by directly replying a communication number that is embedded with a service instance identification code, thereby being relieved of tediousness and troubles when entering any identification into short message text content.

The short message processing method and apparatus of the present invention can record all interactive data on service instances on a storage device (for example, hard disc, cache, flash memory or the like). Thus, even when an application server is restarted or accidentally malfunctions, it can read data from the storage device using a service instance identification code, so as to resume an ongoing interaction. In addition, even in the case of having significantly great amounts of information, the method and apparatus for dynamically correlating service instances according to the present invention would not bring heavy work load to the server system since it is unnecessary to maintain all the data of uncompleted instances in the system memory, thereby it is especially suitable for service applications having great amounts of information.

BRIEF DESCRIPTION OF THE DRAWINGS

Preferred embodiments of the present invention will now be described, by way of example only, with reference to the following drawings in which.

DETAILED DESCRIPTION OF THE PREFERRED EMBODIMENT

Figure 1:
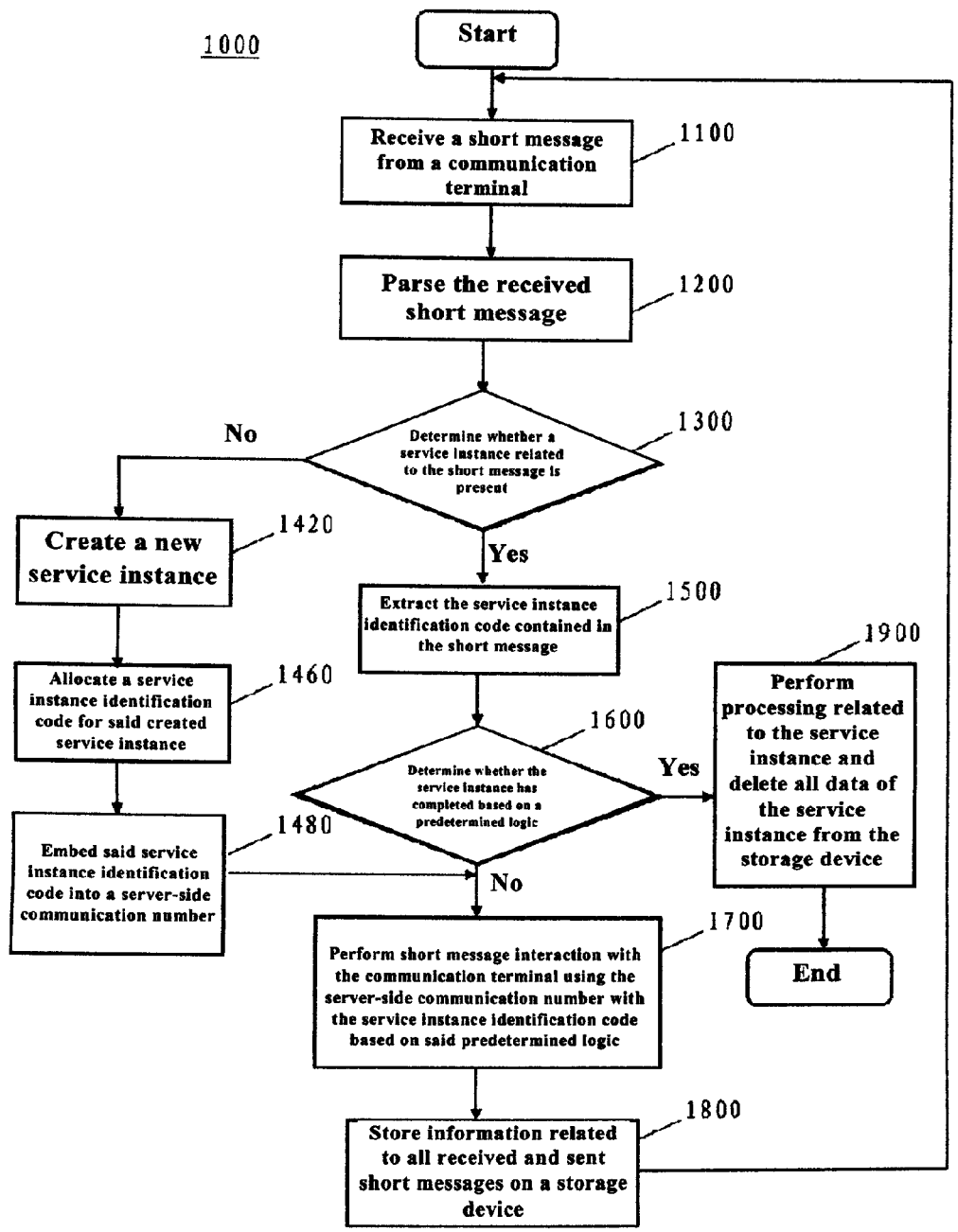
FIG. 1 is a flowchart illustrating a method for dynamically correlating service instances according to an embodiment of the present invention.

It should be understood that the drawings and descriptions of the present invention have been simplified so as to illustrate steps or components that are helpful for clearly understanding the present invention, while omitting other steps or components comprised in a typical service instance correlation for the purpose of not obscuring the present invention. One skilled in the art should appreciate that other steps or components are desirable and/or necessary for implementing the present invention. However, since these steps or components are well-known in the art and are not helpful for better understanding the present invention, descriptions thereof are not present herein. It also should be understood that, the drawings incorporated herein are merely graphical demonstrations of the current exemplary embodiments of the present invention, but steps or components within the scope of the present invention may include steps or components other than those shown in the drawings. The following will be described with reference to the drawings, in which similar steps or components are labeled with similar reference numbers.

As used herein, terms of "service" and "service instance" are two completely different concepts, wherein "service" refers to a kind of service that is provided by a service provider, such as "choosing your favorite super girl"; while "service instance" refers to one or more interaction instances triggered by a user for a "service", such as a voting made by a user for the service of "choosing your favorite super girl". Generally, there can be several service instances for one service.

In Short Message Gateway Protocol (SMGP) V3.0, a server-side communication number is defined as "118+SP-Number+optional", wherein SPNumber represents a service provider code that is designated by a telecommunication service provider. SMGP sets no restrictions in its protocol specification regarding the length of the "optional" field contained in the server-side communication number, so long as it is supported by client-side software. The service instance dynamic correlation technique of the present invention is based on processing of the above-described "optional" field.

As described above, the service instance correlation apparatus and method of the present invention can dynamically allocate a service instance identification code, embed the identification code into the "optional" field in a server-side communication number, and then send short messages to a user using the server-side communication number embedded with the identification code, to enable dynamical correlation of the ongoing interactive service instance merely by the user directly replying the server-side communication number, thereby achieving accurate and convenient service instance correlation.

FIG. 1 is a flowchart illustrating a method 1000 for dynamic correlation service instances according to the present invention. In the embodiment method 1000 shown in FIG. 1, "optional" field in a server-side communication number is defined as ServiceNumber+AppSeq, wherein ServiceNumber represents a service number and AppSeq represents a service instance identification code of a specific user. That is to say, the optional field is comprised of both a service number and a service instance identification code. During the entire life cycle of a service instance, the service instance identification code AppSeq thereof will not be changed.

At step 1100, a service instance dynamic correlation process is initiated in response to receipt of a short message from a user's communication terminal. The received short message is parsed so as to obtain a server-side communication number contained therein (step 1200). The optional field in the server-side communication number includes a service number, i.e. ServerNumber. Next, at step 1300, based on whether the server-side communication number obtained at step 1200 includes a service instance identification code AppSeq, it is determined whether a service instance related to the short message received at step 1100 exists in the server. Specifically, if the server-side communication number obtained at step 1200 includes AppSeq, it is determined that a relevant service instance exists in the server; otherwise, it is determined that a relevant service instance does not exist in the server.

If it is determined at step 1300 that there exists no relevant service instance, i.e. the short message triggering a new service instance, a new service instance about the short message is then created at step 1420. Then, a service instance identification code AppSeq is allocated for the service instance (step 1460), and both the service instance identification code AppSeq and the service number ServiceNumber obtained at step 1200 are embedded into the optional filed in the server-side communication number according to the rule of ServerNumber+AppSeq (step 1480).

If it is determined at step 1300 that there exists a service instance related to the received short message, the service instance identification code AppSeq for the short message is extracted from the server-side communication number obtained at step 1200 (step 1500). Next, it is determined whether the service instance is completed based on a predetermined logic, such as the number of short message interaction for the service instance or a simple logical analysis of the content of short messages (step 1600). As an example, a counter may be provided for the communication terminal in the server, wherein the value of the counter automatically increments by one in response to receipt of a short message from a corresponding communication terminal. Based on the value of the counter, the determination at step 1600 can be made or the content of a reply short message from the server to the communication terminal can be determined.

If it is determined at step 1600 that the service instance has not completed yet, the content of a short message to be sent from the server to the user's communication terminal is determined based on the predetermined logic and is sent to the communication terminal using the server-side communication number embedded with a service instance identification code AppSeq and a service number ServiceNumber (step 1700). The user can perform short message interaction with the server by directly replying the server-side communication number of the received short message.

Alternatively, before, while or after sending the short message in step 1700, information related to short messages received from the communication terminal and short messages sent from the server to the communication terminal in this round of interaction (for example, server-side communication numbers, the content of short messages or the like in each round of interaction) is stored on a storage device (for example, hard disc, cache, flash memory, or the like) of the server (step 1800). For example, data stored on the storage device is indexed with a Key as follows: Key=UserPhone+ServiceNumber+AppSeq, where UserPhone represents the number of the communication terminal. The data can be read from the storage device using the above-described keyword Key, if needed.

Since the above-described embodiment of the present invention includes step 1800 for storing information related to interactive short messages on a storage device such as hard disc, cache, flash memory or the like, it is unnecessary to maintain data of uncompleted instances in a memory of a server, thereby significantly reducing work load of a server system. Since all data are stored on a storage device, these data could be read from the storage device using the service instance identification code even when the server is restarted or accidentally malfunctions, thereby resuming the ongoing interaction.

It should be noted that, step 1800 is not essential for implementing the technique of dynamically correlating service instances of the present invention. For example, step 1800 shown in FIG. 1 may be omitted in the case where there is small amounts of service information thus it is unnecessary to take system memory load into consideration or where the system has a good stability.

After step 1800, the process proceeds to step 1100 to continue to receive user's reply short messages, and steps 1200 through 1800 are repeated until the service instance has been determined as being completed at step 1600. In the case where the service instance has been determined as being completed at step 1600, for example, a predetermined number of short message interactions has been reached or information indicating the completion has been recited in the content of the short message, processing related to the service instance is performed and all date about the service instance on the storage device may be deleted (step 1900). Of course, instead of performing step 1900, data of the service instance may be retained permanently or transmitted to other service platform for further processing. Service instance related process at step 1900 includes, for example, sending information confirming the completion to the communication terminal, analyzing data of service instances or the like.

Alternatively, instead of performing data processing after the completion of a service instance, interactive data can be processed when each round of short message interaction is completed, such as, before or after step 1800 shown in FIG. 1. In a further embodiment of the present invention, the operation for determining the completion of a service instance at step 1600 may be carried out after steps 1700 and 1800. In such case, if it is determined that the service instance has been determined as being completed, the process then proceeds to step 1900; otherwise, the proceed goes to step 1100 and waits for a next round of interaction with the user.

In the practice of short message interaction services, the following situation may exist, that is, short messages sent from a server to a communication terminal may be lost due to communication network fault or user's error in operation, thus a user can not complete a service instance. Regarding the above described situation, in another embodiment of the present invention, a user is allowed to send a request to a designated server-side communication number requesting the server to resend the lost short message. Upon receipt of this request, the server can retrieve the service instance identification code and resend the requested short message to the user.

Figure 2:
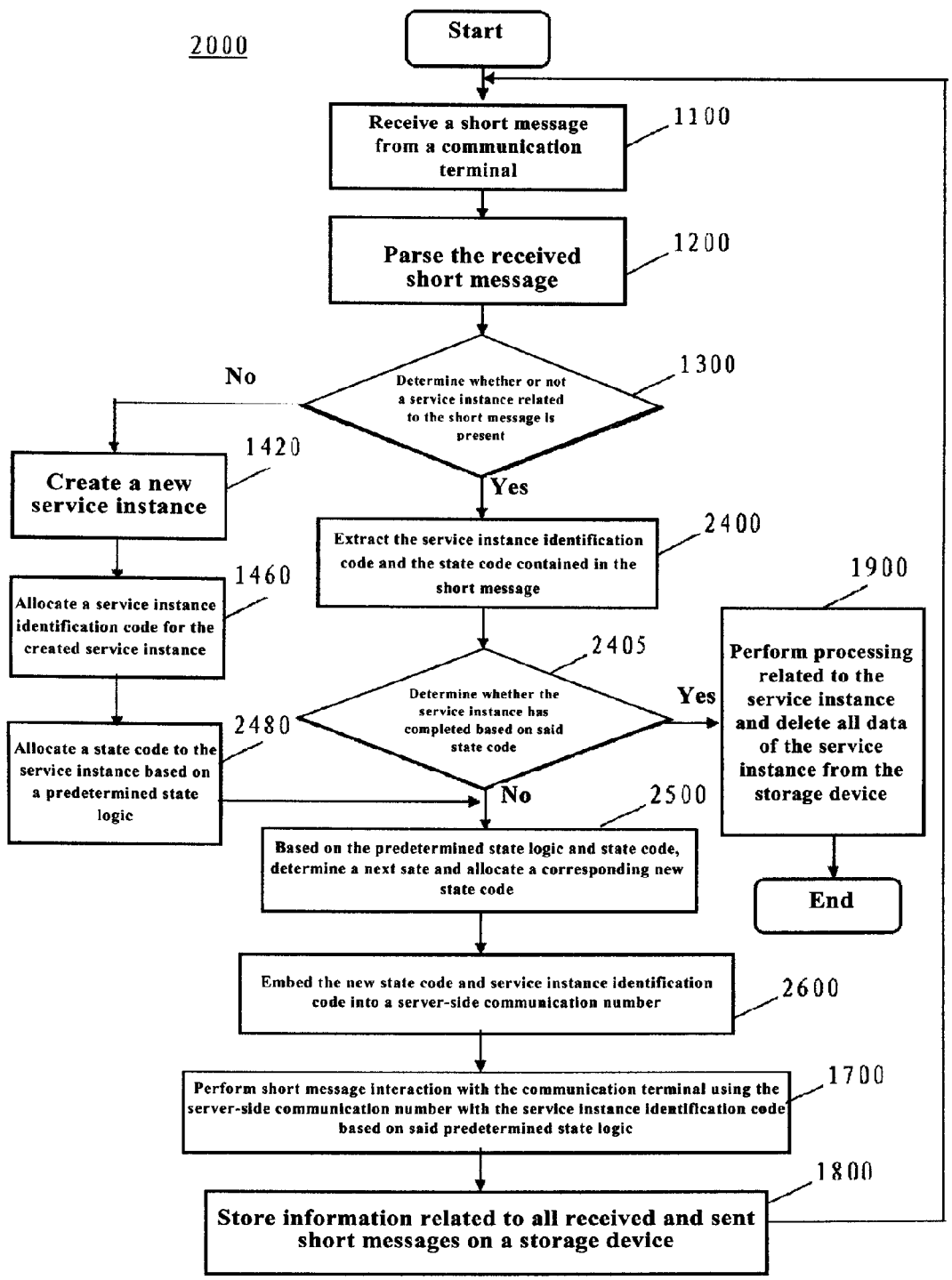
FIG. 2 is a flowchart illustrating a method for dynamically correlating service instances according to another embodiment of the present invention.

FIG. 2 is a flowchart illustrating a method 2000 for dynamically correlating service instances according to another embodiment of the present invention. The method 2000 for dynamically correlating service instances in FIG. 2 is same as the method 1000 for dynamically correlating service instances in FIG. 1, except that steps of setting and adjusting state codes, i.e., steps 2400, 2405, 2480, 2500 and 2600 are included. In the method 2000 for dynamically correlating service instances in FIG. 2, the same reference numbers are employed for steps that are same as those in the method 1000 for dynamically correlating service instances. Steps of setting and adjusting state codes involved in the method 2000 for dynamically correlating service instances will be described below in detail, while descriptions about steps that are same as those in the method 1000 for dynamically correlating service instances are omitted.

In the embodiment 2000 as shown in FIG. 2, "optional" field in a server-side communication number is defined as ServiceNumber+AppSeq+StateSeq, where ServiceNumber represents a service number, AppSeq represents a service instance identification code of a specific user, and StateSeq represents a current state code of a service instance. That is, the optional field is comprised of a service number, a service instance identification code and a state code.

Similar to the method in FIG. 1, the method for dynamically correlating short message service instances in FIG. 2 includes parsing a short message upon receipt of the short message from a communication terminal and determining whether there is a service instance related to the short message based on whether the parsed server-side communication number contains a service instance identification code. In the case where it is determined that there exists no relevant service instance, a new service instance is created and a service instance identification code AppSeq is allocated to the created service instance.

Next, at step 2480, based on a predetermined state logic, a state code StateSeq is allocated to each step of the service instance. Here, the predetermined state logic includes, for example, a state transition map defining the whole process of an entire interaction, such as service logic shown in FIG. 3. The predetermined state logic can be implemented in any other descriptive language such as XML or Java.

If it is determined at step 1300 that there exists a relevant service instance, a service instance identification code AppSeq for the short message and a current state code StateSeq of the interactive process are extracted from the communication number obtained at step 2400. At step 2405, by going through the above predetermined state logic, whether the service instance has completed is determined based on the state code extracted at step 2400.

When it is determined at step 2405 that the service instance has not completed yet, at step 2500, a next state of the interactive process is determined based on the above predetermined state logic and the state code StateSeq extracted at step 2400, and a new state code StateSeq corresponding to the next state is allocated. At step 2600, the new state code StateSeq, the service instance identification code AppSeq and the service number ServiceNumber are together embedded into the optional field in the server-side communication number according to the rule of ServiceNumber+AppSeq+StateSeq. A short message is sent to the communication terminal using the server-side communication number embedded with the new state code and the service instance identification code, and the communication terminal is required to directly reply the server-side communication number so as to perform short message interaction with the server.

It should to be noted that, although in the embodiments described with reference to FIGS. 1 and 2, "optional" field in the server-side communication number is defined as "ServiceNumber+AppSeq" and "ServiceNumber+AppSeq+StateSeq" respectively, those skilled in the art should appreciate that other types of definition can be employed as long as it can make different service instances be distinguished from each other. For example, the server number ServiceNumber in the above field may be omitted. Specifically, for a service having significant amounts of information (such as "choosing your favorite super girl"), a service provider may arrange its server to handle only this service during a period of time. In this case, a service number ServiceNumber in the server-side communication number may be omitted, and all short messages sent to the server are regarded as being directed to said service by default.

Figure 3:
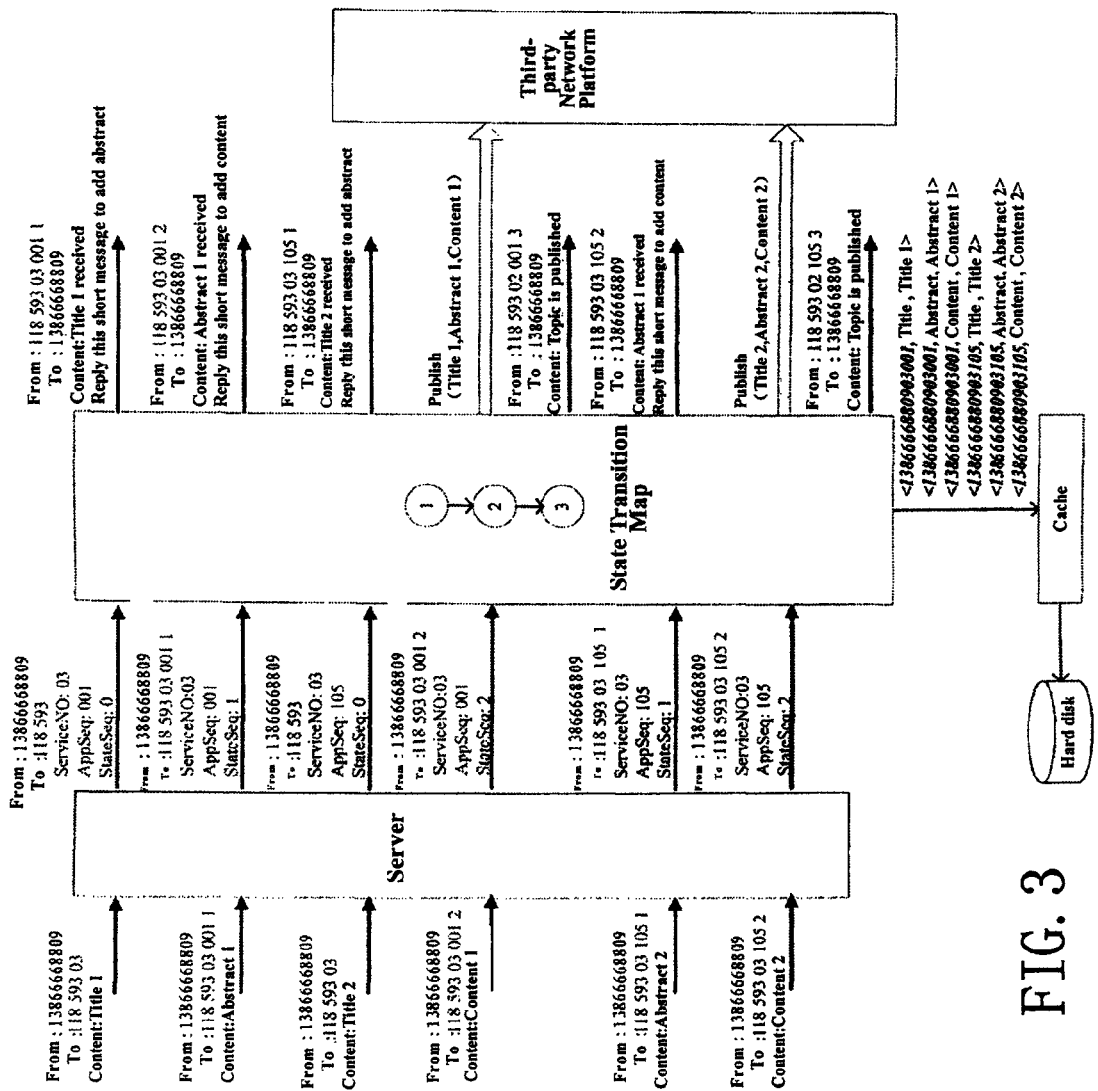
FIG. 3 is an exemplary implementation showing a method for dynamically correlating service instances according to an embodiment of the present invention.

FIG. 3 is an illustrative implementation showing a method of dynamically correlating service instances according to an embodiment of the present invention. In the example shown in FIG. 3, the communication terminal is a mobile phone with an exemplary number of "13866668809". The server-side communication number is defined as "118+SPNumber+optional", wherein the "optional" field is defined as Service-Number+AppSeq+StateSeq. In this example, the service provider code SPNumber is defined as "593". The service instance identification code AppSeq is generated based on the system time when the service instance is generated, such as "001" and "105".

The exemplary description in FIG. 3 is about a "publishing service", wherein "03" is allocated to the service number ServiceNumber. It can be known from the service logic shown in FIG. 3 that, the "publishing service" is comprised of three states, i.e. state 1 (StateSeq=1) representing "Title sent from a user is received", state 2 (StateSeq=2) representing "Abstract sent from a user is received", and state 3 (StateSeq=3) representing "Content sent from a user is received". It needs to be noted that, definitions and settings about the above code and identification code are merely for illustrative purpose, but are not intended to limit the present invention within the disclosed specific embodiments.

During a first round of interaction, a short message for service "03" is sent from the user's communication terminal "13866668809" to the server "593" with a content of "Title 1". At this time, the server-side communication number is "118 593 03". Upon receipt of the short message, the server parses the short message, and thus determines that the short message is directed to the service having a service number of "03". Since the server-side communication number "118 593 03" at this time does not include any service instance identification code, it is determined that there exists no service instance related to the short message, thus a new service instance is created and "001" is allocated thereto as its service instance identification code AppSeq. At this time, the state code, StateSeq, is set as "0".

From a service logic map, it can be known that the next state of the interactive service instance is "1", i.e. "Title sent from a user is received". Then, a new server-side communication number is constructed, i.e. "118 593 03 001 1" and is used for sending content "Title 1 received and reply this short message to add an abstract" to the communication terminal. When the user has received the short message, the first round of interaction ends and data (i.e. "Title 1") received from the user during this round of interaction is stored on the storage device with an index of Key=13866668809+03+001.

The user directly replies the received short message (i.e., sending to the server-side communication number of "118 593 03 001 1") and adds "Abstract 1" to the content, thus a second round of interaction starts. After receipt of the user's reply short message, the server parses said the reply short message and determines that the short message is directed to the service instance with an identification code "001" and its current state is "1". The next state is determined as "2" using the service logic, i.e. "Abstract sent from a user is received". Then, a new server-side communication number is generated, i.e. "118 593 03 001 2" and is used for sending content "Abstract 1 received and reply this short message to add content" to the communication terminal. When the user has received the short message, the second round of interaction ends. Data (i.e. "Abstract 1") received from the user during this round of interaction is stored on the storage device with an index of Key=13866668809+03+001.

When a third round of interaction starts, the user does not make a reply for the short message sent by the server-side communication number of "118 593 03 001 2", but sends "Title 2" to "118 593 03". Since the server-side communication number "118 593 03" at this time does not contain any service instance identification code, the server determines that the user has restarted a new service instance.

The server allocates an identification code AppSeq of "105" for the new service instance and sets the state code as "0". In the same manner as that of the first round of interaction, a new server-side communication number of "118 593 03 105 1" is created and used to send short messages to the communication terminal, thus the third round of interaction ends. Data (i.e. "Title 2") received from the user during this round of interaction is stored on the storage device with an index of Key=13866668809+03+105.

A fourth round of interaction is carried out in the same manner as the second round of interaction, both of which are directed to service instance "001". The next state is determined as "3" using the service logic in the server and the end of the logic has been reached. At this time, it is determined that interactive communication of service instance "001" has completed. All data for service instance "001" is extracted from the storage device and then transmitted to a third-party network platform for further processing. For example, the received three pieces of data (i.e. "Title 1", "Abstract 1" and "Content 1) are published in a predefined format.

A fifth round of interaction and a sixth round of interaction are carried out in a similar manner as the third round of interaction, where "Abstract 2" and "Content 2" are input for the service instance "105", descriptions thereof are omitted for clarity.

Figure 4:
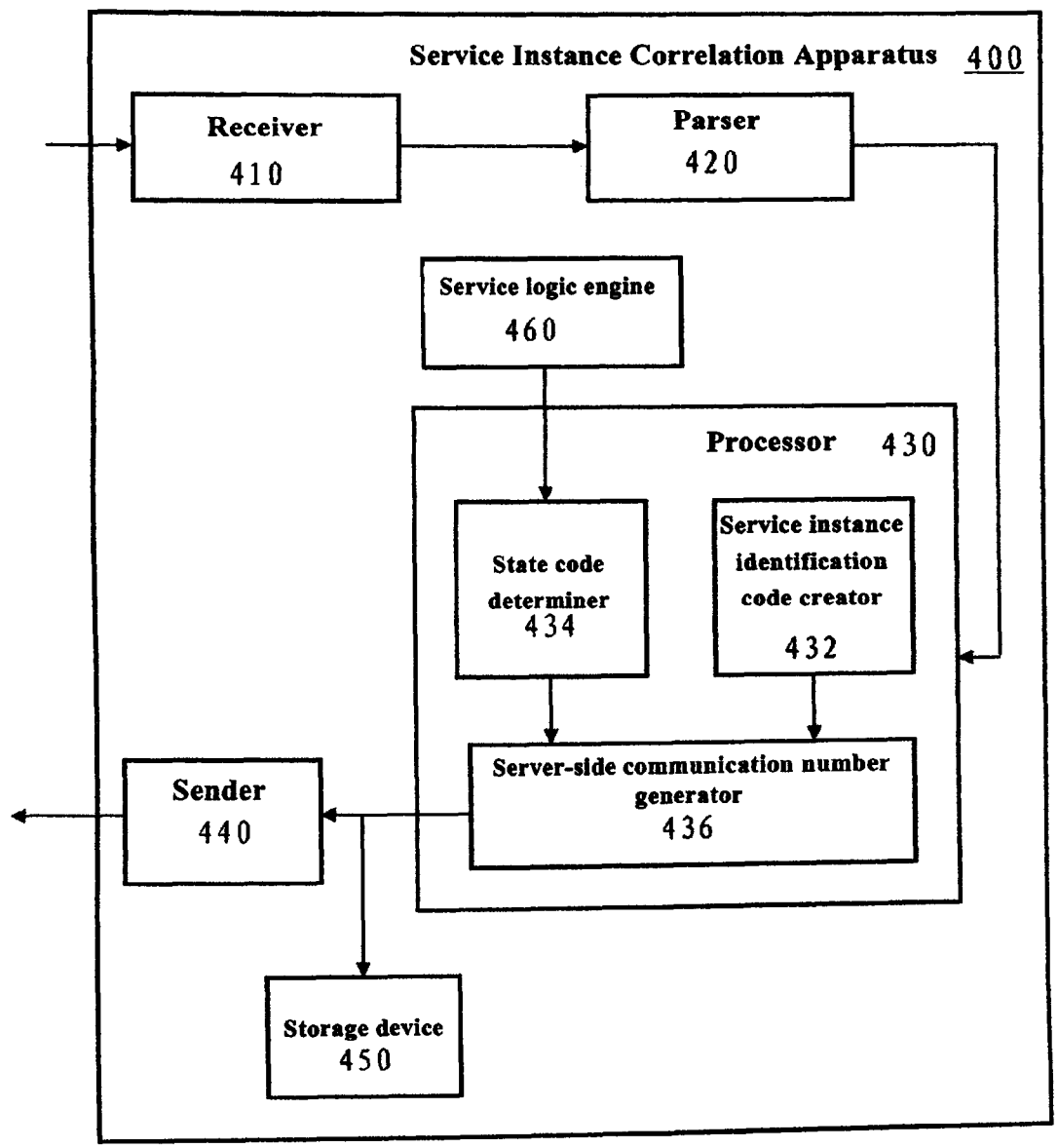
FIG. 4 is a block diagram illustrating a apparatus for dynamically correlating service instances according to an embodiment of the present invention.
Figure 5:
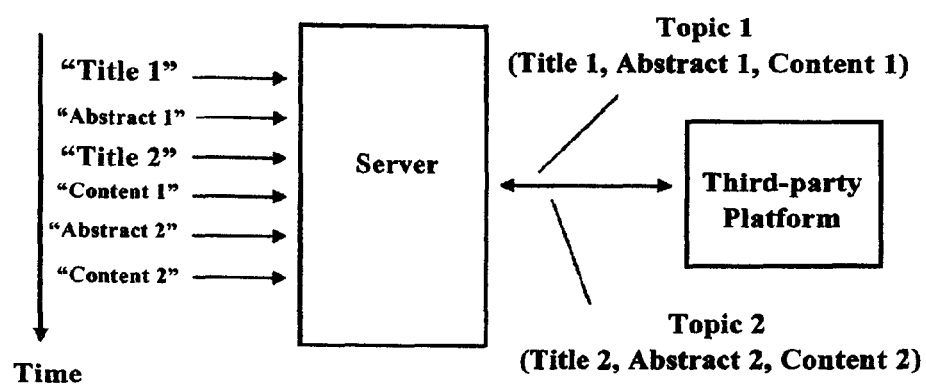
FIG. 5 is a schematic diagram showing an example of short message interaction.

FIG. 4 is a block diagram illustrating a service instance dynamic correlation apparatus 400 according to an embodiment of the present invention. As shown in the figure, the service instance dynamic correlation apparatus 400 includes a receiver 410, a parser 420, a processor 430, a sender 440 and a storage device 450.

The receiver 410 is configured to receive a short message for a certain service from a communication terminal. Then, the parser 420 parses the short message received by the receiver 410 to obtain a server-side communication number contained in the short message, thereby obtaining a service number ServiceNumber, a service instance identification code AppSeq and a state code StateSeq. Note that, when a user triggers the first message of an interaction, the server-side communication number contained in the short message does not include a service instance identification code AppSeq and a state code StateSeq.

The processor 430 is configured to process the server-side communication number obtained by the parser 420 so as to be correlated with a service instance. More particularly, when the server-side communication number obtained by the parser 420 does not include a service instance identification code and a state code, a new service instance is created in a service instance identification code creator 432 and a service instance identification code AppSeq is allocated to the created new service instance. Next, in a state code determiner 434, the next state of the created or existing service instance is determined with reference to a service logic described in a service logic engine 460 and a next state code StateSeq corresponding to the created or existing service instance is allocated thereto.

Next, in a server-side communication number generator 436, the ServicNumber obtained by the parser 420, the service instance identification code AppSeq created by the service instance identification code creator 432 and the state code StateSeq determined by the state code determiner 434 are embedded into the "optional" field according to the rule of ServiceNumber+AppSeq+StateSeq, so as to generate a server-side communication code for the next round of interaction. The sender 440 is configured to send a short message to the communication terminal using the above described server-side communication number that is embedded with the new state code and the service instance identification code, and require the communication terminal to directly reply the server-side communication number so as to perform short message interaction with the server. Alternatively, information related to short messages received from the communication terminal and short message sent from the server to the communication terminal are stored on the storage device 450.

Figure 6:
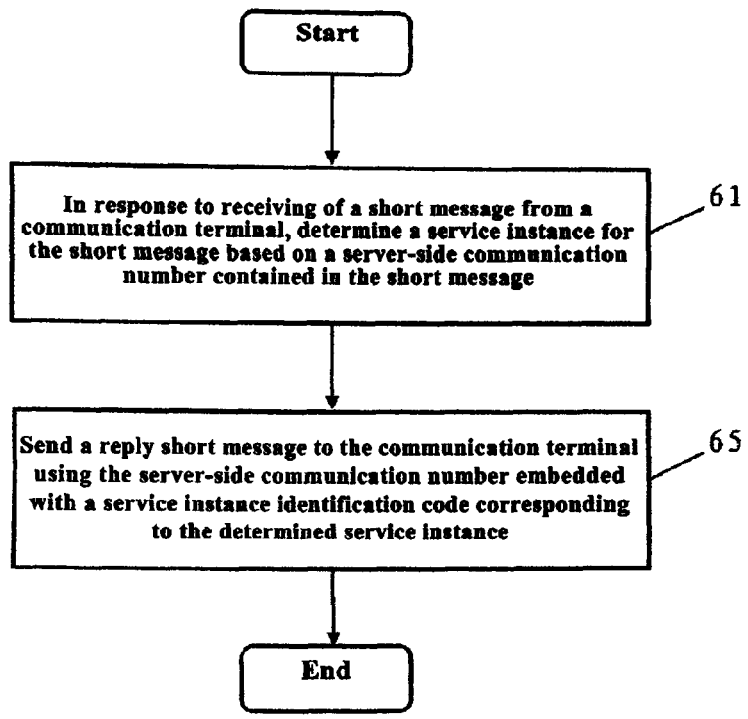
FIG. 6 is a flowchart illustrating a short message processing method according to an embodiment of the present invention.

According to still another embodiment of the present invention, as shown in FIG. 6, a short message processing method is provided. At step 61 of the method for dynamically correlating service instances, in response to receiving of a short message from a communication terminal, a service instance for the short message is determined based on a server-side communication number contained in the short message. Then, at step 65, a reply short message is sent to the communication terminal using the server-side communication number that is embedded with a service instance identification code corresponding to the determined service instance.

Figure 7:
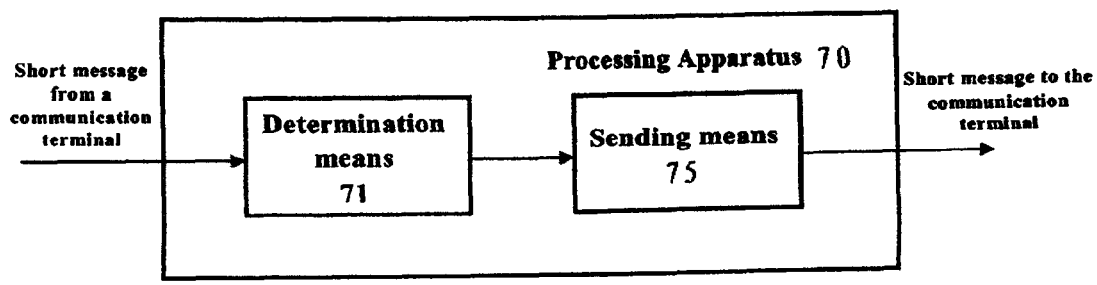
FIG. 7 is a block diagram showing a short message processing apparatus according to an embodiment of the present invention.

According to a further embodiment of the present invention, as shown in FIG. 7, a short message processing apparatus 70 is provided. The short message processing apparatus 70 includes determination means 71 and sending means 75. In response to receiving of a short message from a communication terminal, the determination means 71 determines a service instance for the short message based on a server-side communication number contained in the short message. Based on the determination result obtained by the determination means 71, the sending means 75 sends a reply short message to the communication terminal using the server-side communication number that is embedded with a service instance identification code corresponding to the determined service instance.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in any tangible medium of expression having computer usable program code embodied therein.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium supporting for example the Internet or Intranet, or a magnetic storage device. Note that the computer usable or computer readable medium even may be paper or other suitable medium on which programs are printed, and this is because the programs can be obtained electronically by electrically scanning the paper or other medium, and then be compiled, interpreted or processed appropriately, and be stored in a computer memory if necessary. In the context of this document, a computer usable or computer readable storage medium may be any medium that contains, stores, communicates, propagates, or transmits a program for use by or in connection with an instruction execution system, apparatus, or device. A computer useable medium may include a data signal with computer usable program code embodied therein, propagated in baseband or as part of a carrier wave. The computer usable program code may be transmitted using any appropriate medium, including but not limited to wireless, wireline, optical fiber cable, RF, etc.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local are network (LAN) or a wide area network (WAN), or the connection may be made to an external computer (for example, through the Internet using an Internet Service Provider).

Aspects of the present invention are described above with reference to flowchart illustration and/or block diagram of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be store in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer other programmable apparatus provide process for implementing the function/acts specified in the flowchart and/or block diagram block or blocks.

The flowchart illustrations and block diagrams in the figures illustrate the architecture, functionality, and operation of possible implementations of systems, methods and computer program products according to various embodiments of the present invention. In this regard, each block in the flowchart illustrations or block diagrams may represent a module, program segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is merely for the purpose of describing particular embodiments but is not intended to limit the present invention. As used herein, the singular forms "a", "an" and "the" are intended to include the plural forms as well, unless the context clearly indicates otherwise. It should be further understood that, the terms "comprises" and/or "comprising" when used in this specification, specify the presence of stated features, integers, steps, operations, elements and/or components, but do not preclude the presence or addition of one or more other features, integers, steps, operations, elements, components, and/or groups thereof.

The corresponding structures, materials, acts, and equivalents of all means or steps plus function elements in the claims are intended to include any structure, material or act for performing the function in combination with other claimed elements as specifically claimed. The description of the present invention has been presented for purpose of illustration and description, but is not intended to be exclusive or limit the present invention within the form disclosed. Many modifications and variations will be apparent to those skilled in the art without departing from the scope of the present invention. The embodiments are chosen and described in order to best explain the principles of the invention and the practical application, and to enable those skilled in the art to understand the present invention may include various embodiments that have various modifications and are suitable for desired specific use.

The invention claimed is:

1. A short message processing method, comprising:
   in response to receiving a short message from a communication terminal, determining a service instance for the short message based on a server-side communication number contained in the short message, said determining comprising:
   parsing the short message received from the communication terminal to obtain the server-side communication number, and
   extracting a service instance identification code and a current state code of said service instance contained in the server-side communication number according to a predefined rule; and
   sending a reply short message to the communication terminal using a new server-side communication number that is embedded with the service instance identification code corresponding to the determined service instance and a next state code of the service instance, said next state code determined by:
   applying a predetermined state logic to determine a content of the reply short message sent to the communication terminal based on the current state code,
   determining a next state of the service instance based on a predetermined state logic and allocating the next state code corresponding to the next state to the service instance; and combining the determined next state code with the service instance identification code according to said predefined rule, so as to obtain said new server-side communication number.

2. The method according to claim 1, wherein the step of determining the service instance for the short message based on the server-side communication number contained in the short message further comprises:
determining whether a service instance correlated with the short message exists, based on the server-side communication number contained in the short message; and
in response to a determination that a service instance correlated with the short message does not exist, creating a service instance correlated with the short message.

3. The method according to claim 2, further comprising embedding a service instance identification code corresponding to the created service instance into the server-side communication number.

4. The method according to claim 1, wherein said determining content of the reply short message sent to the communication terminal based on the predetermined state logic further comprises:
in response to receiving of a short message from the communication terminal, adjusting a value of a counter; and
determining content of a reply short message to be sent to the communication terminal based on the value of said counter.

5. The method according to claim 1, further comprising:
storing short message interactive data of service instances on a storage device, wherein data of corresponding service instances are indexed with service instance identification codes.

6. The method according to claim 5, further comprising:
in response to a request for a server to resend when the communication terminal has lost short messages from the server, using the service instance identification codes to retrieve and then resend the requested short messages.

7. The method according to claim 1, wherein said current state code of said service instance contained in the server-side communication number is used to correlate a plurality of short messages with service instances independent of the arrival time of these short messages, and when multiple interactive service instances from a same user are carried out simultaneously.

8. The method according to claim 1, wherein said service instance identification code and said current state code of said service instance is included in an optional field of said server-side communication number.

9. A short message processing apparatus, comprising:
a hardware receiver circuit configured to receive a short message from a communication terminal, said short message having a server-side communication number;
a hardware processor configured to:
determine, in response to receiving said short message from said communication terminal, a service instance for the short message based on said server-side communication number contained in the short message, said determining comprising:
parsing the short message received from the communication terminal to obtain the server-side communication number, and
extracting a service instance identification code and a current state code of said service instance contained in the server-side communication number according to a predefined rule; and
a hardware transmit circuit configured to send a reply short message to the communication terminal using a new server-side communication number that is embedded with the service instance identification code corresponding to the determined service instance and a next state code of the service instance, said hardware processor is further configured to determine said next state code by:
applying a predetermined state logic to determine a content of the reply short message sent to the communication terminal based on the current state code,
determining a next state of the service instance based on a predetermined state logic and allocating the next state code corresponding to the next state to the service instance; and
combining the determined next state code with the service instance identification code according to said predefined rule, so as to obtain said new server-side communication number.

10. The apparatus according to claim 9, wherein said hardware processor is further configured to:
determine whether a service instance relates to the short message exists, based on the server-side communication number contained in the short message; and
create, in response to a determination that the service instance correlated with the short message does not exist, the service instance correlated with the short message.

11. The apparatus according to claim 10, wherein said hardware processor is further configured to embed a service instance identification code corresponding to the created service instance into the server-side communication number.

12. The apparatus according to claim 9, wherein said hardware processor is further configured to: determine content of the reply short message sent to the communication terminal based on a predetermined logic.

13. The apparatus according to claim 12, wherein to determine content of the reply short message sent to the communication terminal based on the predetermined logic, said hardware processor is further configured to:
in response to receiving of a short message from the communication terminal, increment a value of a counter by one; and
determine content of a reply short message to be sent to the communication terminal based on the value of said counter.

14. The apparatus according to claim 9, wherein said hardware processor is further configured to:
store short message interactive data of service instances on a storage device, wherein data of corresponding service instances are indexed with service instance identification codes.

15. The apparatus according to claim 14, wherein said hardware processor is further configured to:
in response to a request for a server to resend when the communication terminal has lost short messages from the server, retrieve by using the service instance identification codes and then resend the requested short messages.

16. The apparatus according to claim 9, wherein said current state code of said service instance contained in the server-side communication number is used to correlate a plurality of short messages with service instances independent of the arrival time of these short messages, and when multiple interactive service instances from a same user are carried out simultaneously.

17. The apparatus according to claim 9, wherein said service instance identification code and said current state code of said service instance is included in an optional field of said server-side communication number.

* * * * *